Figure 5:
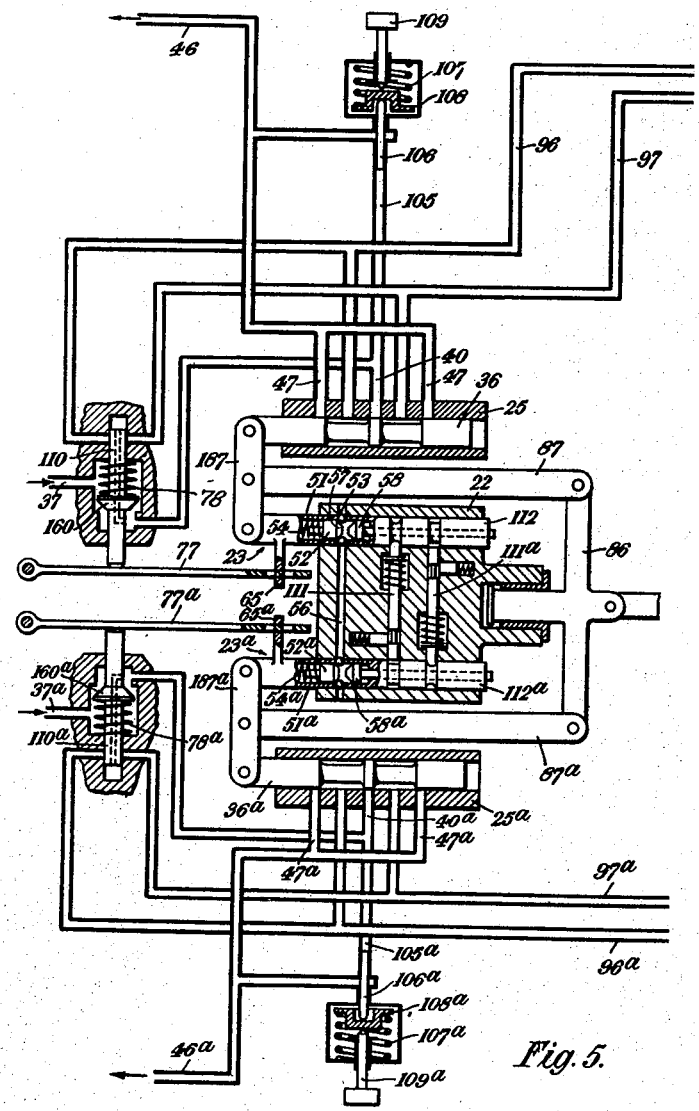

May 20, 1952 R. WESTBURY ET AL 2,597,418
HYDRAULIC SERVOMOTOR AND THE LIKE
Filed May 27, 1950 5 Sheets-Sheet 1
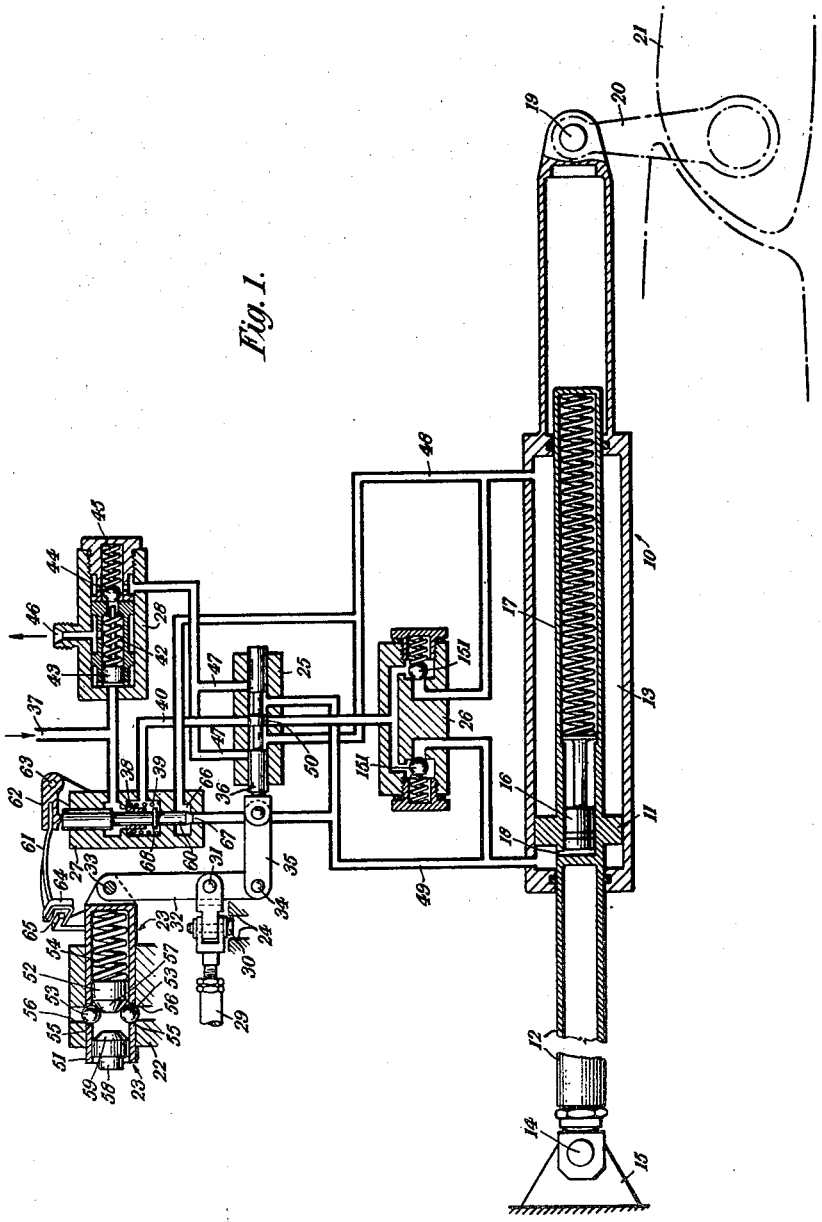
INVENTORS
ROY WESTBURY AND
STANLEY RALPH TYLER
By Moses, Nolte, Crews & Berry
Attorneys May 20, 1952   R. WESTBURY ET AL   2,597,418
HYDRAULIC SERVOMOTOR AND THE LIKE
Filed May 27, 1950   5 Sheets-Sheet 2
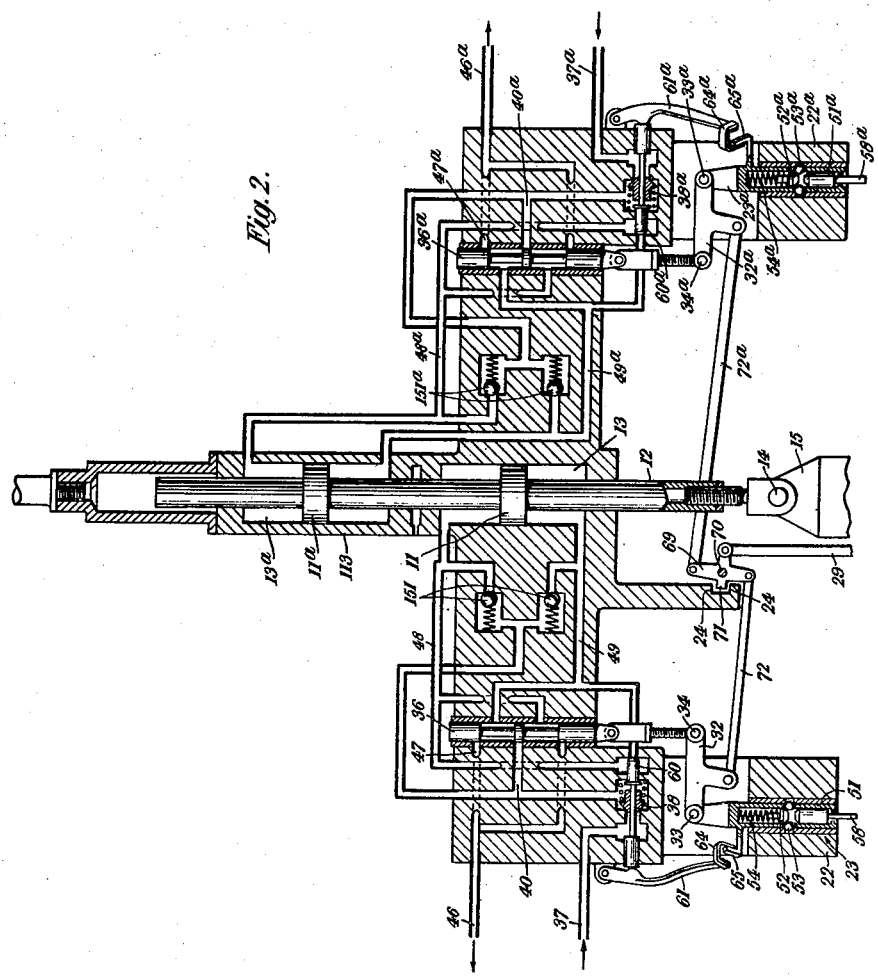
INVENTORS
ROY WESTBURY AND
STANLEY RALPH TYLER
By Moses, Nolte, Crews +/Berry
Attorneys

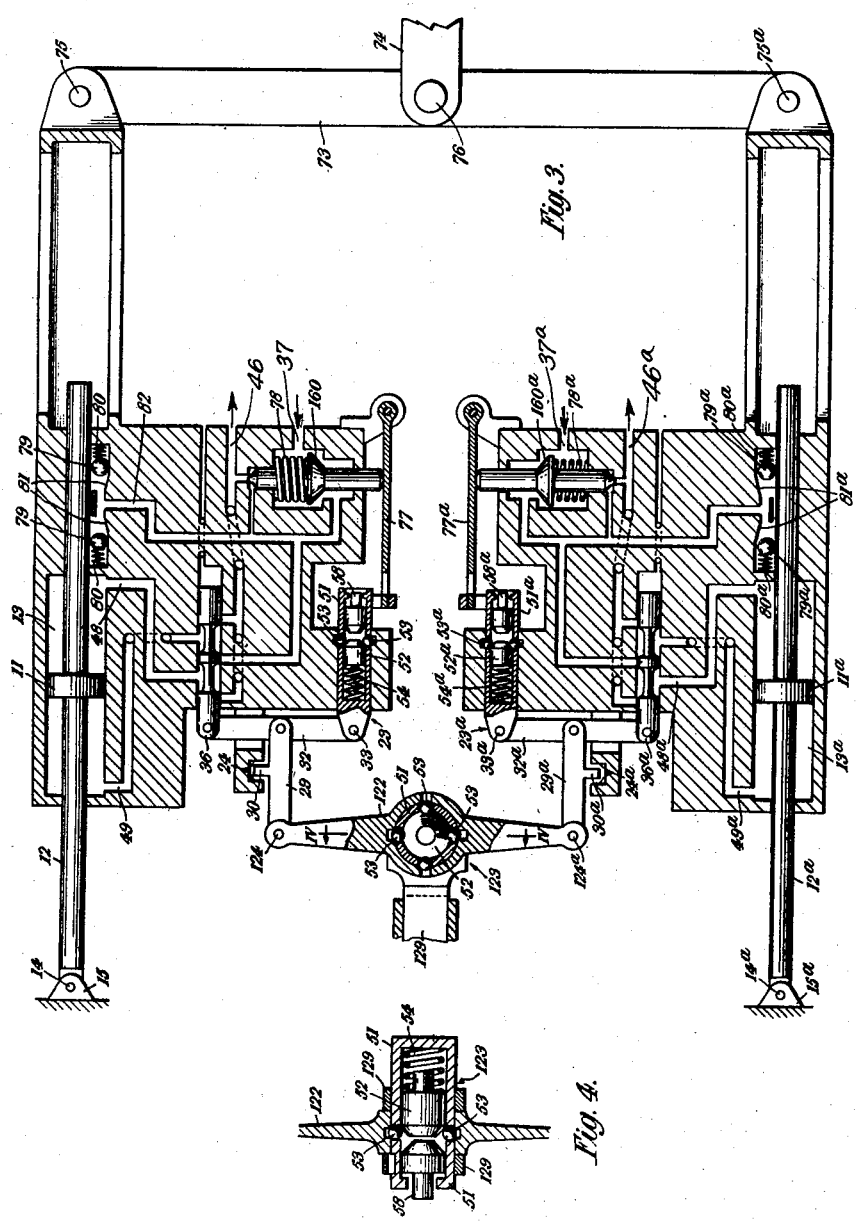

Patented May 20, 1952

2,597,418

UNITED STATES PATENT OFFICE 2,597,418

HYDRAULIC SERVOMOTOR AND THE LIKE

Roy Westbury, Bridgnorth, and Stanley Ralph Tyler, Willenhall, England, assignors to H. M. Hobson Limited, London, England, a company of Great Britain Application May 27, 1950, Serial No. 164,654
In Great Britain June 2, 1949

11 Claims. (Cl. 60—97)

1

This invention relates to a hydraulic actuator (i. e. a hydraulic jack or motor) of the type comprising a manually operable input member and a control valve operable by the input member to effect alternative pressure and exhaust connections to the actuator to cause the latter to move an output member in a direction, and to an extent, determined by the movement imparted to the input member.

Such actuators are frequency used for the directional control of aircraft, ships and other vehicles and disastrous results may ensue, particularly where the actuator is utilised to operate the control surface of an aircraft, should the control valve seize in an open position, and so allow pressure to flow to the actuator and drive the control surface to an undesired extreme position.

With a view to obviating this disadvantage, the invention provides a hydraulic actuator of the above type which includes a collapsible member, linked to the input member and adapted to collapse, when subjected to a predetermined load as the result of valve seizure and consequent excessive application of manual force to the input member, and a valve arranged to be operated, on collapse of the collapsible member, to shut off the supply of liquid under pressure to the control valve.

When such an installation is applied, for example, to the positioning of a control surface of an aircraft, seizure of the control valve in open position cannot lead to uncontrolled movement of the output member, since the pilot will automatically resist undesired movement of the control surface by applying increased force to the input member. This will cause the collapsible member to collapse and actuate the valve to shut off the pressure supply to the control valve.

Preferably this valve operates also, on collapse of the collapsible member, to short circuit the actuator by establishing direct liquid communication between opposites sides thereof, thereby enabling it to move freely despite continued seizure of the valve, and so permit of movement of the output member either manually or by another servo system.

Figure 5A:
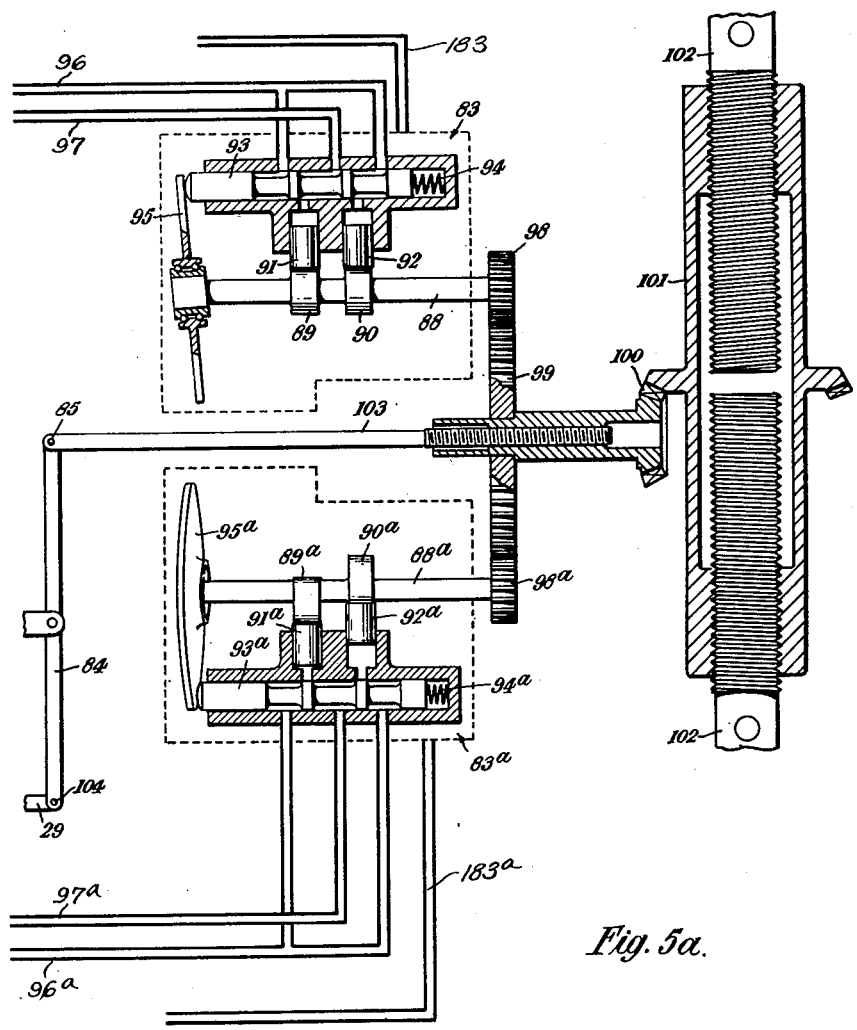

Some embodiments of the invention will now be described in detail, by way of example, with reference to the accompanying drawings, in which:

Fig. 1 is a diagrammatic showing of a hydraulic jack according to the invention, Fig. 2 is a diagram showing the application of the invention to a system embodying two hydraulic jacks in tandem, Fig. 3 is a diagram showing the application of the invention to a system embodying two hydraulic jacks in parallel, Fig. 4 is a section on the line IV—IV in Fig. 3, and Figs. 5 and 5a are diagrams showing the application of the invention to a system embodying two hydraulic motors.

Like reference numerals indicate like parts throughout the figures.

Considering Fig. 1, first of all, the installation shown therein includes a hydraulic jack 10, the piston 11 of which carries a piston rod 12, which projects from the jack cylinder 13 and is pivoted at 14 to a fixed point 15 of the aircraft structure. Inside the piston rod is a pressurising piston 16 loaded by a spring 17, the piston 16 serving to apply pressure, through a hole 18 in the piston rod 12, to the liquid contained in the cylinder 13.

The cylinder 13 is pivoted, at 19, to an output member 20 for applying movement, as the cylinder 13 moves in relation to the jack piston 11, to an aileron or other control surface 21. The object of the pressurising piston 16 is to maintain maximum rigidity of the liquid in the connection between the control surface 21 and the aircraft, for the purpose of preventing flutter of the control surface.

Fixed to the cylinder 13 are:

(a) The housing 22 of a collapsible member 23,
(b) A pair of stops 24,
(c) A control valve housing 25,
(d) The housing 26 of a pair of non-return valves,
(e) The housing 27 of a supply check valve and a jack by-pass valve, and
(f) The housing 28 of a return check valve.

Fig. 1 being purely diagrammatic, the connections between the cylinder 13 and the parts 22 and 24—28 are not shown therein.

An input member 29, connected to the pilot's control column, carries a projection 30 which moves with clearance between the stops 24 during normal operation of the jack. The input member 29 is pivoted at 31 to a link 32 pivoted at one end, 33, to the collapsible member 23 and at the other end, 34, to a link 33 for imparting movement to the control valve 36 of the jack.

Liquid under pressure, supplied through an inlet 37, normally holds a tubular non-return valve 38 open, against a spring 39, and so obtains access to a line 40 controlled by the middle land of the control valve 36. The hydraulic pressure also urges to the right, against a spring 42, a piston 43, thereby holding a non-return valve 44 open against its spring 45. This places in communication, with an exhaust outlet 46, lines 47 controlled by the outer lands of the control valve 36.

During normal operation of the jack, the link 32 will, on movement of the input member 29, pivot about the point 33 and displace the control valve 36 to connect, in conventional fashion, through lines 48, 49 one end of the cylinder 13 to pressure and the other to exhaust. The cylinder 13 will then move, in the same direction as the control valve 36, until the housing 25, which travels with it, causes the lands of the control valve again to mask the ports in the housing communicating with the lines 40, 47. The cylinder 13 thus moves to an extent and in a direction determined by the movement of the input member 29.

In the event of failure of the hydraulic pressure, the non-return valves 38, 44 close to trap liquid in the jack. Manual operation of the jack is then possible by moving the input member 29 sufficiently for it to actuate one or other of the stops 24 to move the jack cylinder 13. When the input member 29 is so moved, the central land of the control valve 36 opens a port 50 to allow, as described in U. S. application 785,837, now Patent No. 2,566,273, issued August 28, 1951, trapped liquid to circulate from one end of the cylinder to the other through one or other of a pair of non-return valves 151.

The collapsible member 23, which is described in detail in U. S. application Serial No. 164,653, serves to deal with the contingency of the control valve 36 seizing in its housing 25 during normal hydraulic operation of the jack. It comprises a cylindrical tube 51, which is a close fit in a cavity in the housing 22 and free to slide therein, a plunger 52 slidable in the tube 51, a plurality of balls 53, and a compression spring 54. The tube 51 is pivoted at 33 to the link 32 and the spring 54 is mounted in compression between the head of the plunger 52 and the end of the tube 51. The balls 53 project through holes 55 in the tube 51 and into holes 56 in the housing 22 and normally the outer and smaller portion of each ball 53 projects into and fits closely within the holes 55, 56. The plunger 52 has an inwardly tapering head 57 which presses the balls 53 outwards into the position illustrated.

The balls 53 consequently resist sliding movement of the tube 51 in relation to the housing 22, as such movement would necessitate that the balls ride inwardly down the tapered face of the head 57 and consequently in movement of the plunger 52 to the right, thereby increasing the compression of the spring 54. When, however, the load seeking to move the tube 51 axially in relation to the housing 22, and imposed thereon by the pilot in the effort to free the control valve 36, when seized, reaches a predetermined limit, the balls 53 will be moved inwardly to an extent sufficient for them to cease resisting movement of the tube 51, with the result that the member 23 is collapsed.

A resetting plug 58, having a conical head 59, may be moved into the tube 51, to reset the member 23. After the tube 51 has been moved back into position to align the holes 55 with the holes 56, pressure on the plug 58 will force the balls 53 back into the position shown.

Mounted within the tubular non-return valve 38 is a closely fitting plunger 60. This plunger is normally held down by a leaf spring 61, one end of which is attached to a member 62 pivoted at 63 to the housing 27, and the other end of which carries a catch 64 engaging a corresponding catch 65 on the tube 51. The lower end of the spring-loaded plunger 60 extends into an annular chamber 66 communicating with one end of the cylinder 13, while the other end of the cylinder communicates with a port 67 in the annular chamber 66 which is normally sealed by the end of the spring-loaded plunger 60. The area of the port 67 is equal to half the cross-sectional area of the portion of the plunger stem enclosed in the annular chamber 66, so that the plunger 60 is subjected to equal upward loads by a given pressure existing in either end of the cylinder.

A subsidiary function of the spring-loaded plunger 60 is to prevent excessive pressure being generated at either end of the cylinder 13 due to excessive reaction load from the control surface 21. The leaf spring 61 is so designed that the plunger 60 may lift against it, under excessive pressure on its lower end, or on the differential area thereof exposed to the pressure in the chamber 66, thereby relieving the pressure in the cylinder. The plunger 60 will of course move down again to sealing position when the reaction load has returned to a safe value.

The main function of the spring-loaded plunger is however fulfilled when the collapsible member 23 collapses due to seizure of the control valve 36. The catch 65 is then removed from the catch 64 on the leaf spring 61, which is thus disabled whereupon the plunger 60 is lifted by the hydraulic pressure acting on its lower end, affording free communication between the two ends of the cylinder 13. As the plunger 60 lifts, a collar 68 on it closes the non-return valve 38 and cuts off the pressure supply to the control valve 36.

As communication is opened between the two ends of the cylinder 13 when the collapsible member 23 collapses, the system offers no resistance to movement of the control surface 21 by a second hydraulic system, which may be constituted by an exactly similar hydraulic jack, deriving pressure from a different source, and the control valve of which is also linked to the pilot's input member 29.

In the case of the installation shown in Fig. 2, two jack pistons 11, 11a are mounted in tandem on a common piston rod 12, pivoted at 14 to the aircraft structure and movable respectively in cylinders 13, 13a in a common housing 113 which constitutes an output member connected to a control surface or to the head of the rotor of a helicopter. Movement of the housing 113 thus serves to impart movement to the control surface or to adjust the rotor head, e. g. by varying the blade pitch or by tilting the rotor head.

Parts associated with the jack piston 11 bear the same references as the corresponding parts in Fig. 1, while parts associated with the jack piston 11a bear the same reference numerals as the corresponding parts associated with the jack piston 11, but with the addition of the suffix a.

The pilot's input member 29 is connected to a member 69, pivoted at 70 and having a nose 71 which is movable between the stops 24. The member 69 is connected, by links 72, 72a to links 32, 32a.

Normally, movement of the input member 29 will rock the links 32, 32a in opposite directions about their points 33, 33a of pivotal attachment to their respective collapsible members 23, 23a to move the control valves 36, 36a in the same direction, thereby admitting hydraulic fluid to the corresponding ends of the two cylinders 13, 13a and establishing exhaust connections to the opposite ends of the jack cylinder.

If, however, one of the control valves, say the control valve 36, seizes, the force exerted by a pilot on the input member 29 will collapse the associated collapsible member 23. The associated valve 60 will then move, precisely as described with reference to Fig. 1, to cut off the pressure supply from the associated control valve 36 and to establish a by-pass connection between opposite ends of the jack cylinder 13. The failed jack 11 then offers no resistance to continued operation of the output member by the other jack, which is controlled by its control valve 36a. After the member 23 has collapsed, the link 32 turns idly, in response to movement of the input member, 29, about its point of attachment 34 to the seized control valve 36. Stops (not shown) serve to limit the movement of the control valve 36.

In Fig. 3, the two jack pistons 11, 11a are mounted in parallel, and the associated jack cylinders are pivoted at their ends 75, 75a to opposite ends of a differential link 73 which is pivoted centrally, at 76, to an output member 74.

Parts associated with the jack piston 11 bear the same reference numerals as corresponding parts in Fig. 1, and parts associated with the jack piston 11a bear the suffix a in addition to the reference numeral borne by corresponding parts associated with the jack piston 11.

The valves 160, 160a in Fig. 3 differ from the valve 60 of Fig. 1. Normally they are held in the position shown by catches 77, 77a respectively. On collapse of either collapsible member 23 or 23a, due to seizure of the corresponding control valve 36 or 36a, the associated catch 77 or 77a is freed. A spring 78 or 78a then closes the associated valve 160. Closure of, for example, the valve 160 cuts off the pressure from the associated control valve 36. It also, in contradistinction to opening a by-pass between opposite ends of the associated jack cylinder 13, causes a lock to be operated to prevent further movement of the cylinder 13 in relation to the jack piston 11.

This lock is of the roller jamming type and comprises a pair of rollers 79, each loaded by a spring 80 and coacting with an inclined surface 81 on the cylinder 13. When the valve 160 is open, pressure is admitted through a passage 82, thereby forcing the rollers 79 apart down the inclined surfaces 81 into the position shown in which they are ineffective. As soon as the valve 160 closes, pressure is cut off from the passage 82, and the springs 80 move the rollers inwards, up the inclined surfaces 81 and into position to lock the piston rod 12 to the cylinder 13. A precisely similar roller jamming lock is associated with the piston rod 12a.

If therefore either control valve 36, or 36a seizes, the associated servo cylinder 13 or 13a is locked against movement in relation to its servo piston 11 or 11a, while the other servo cylinder is free to actuate the load, the differential link 73 swinging about its point of attachment, 75 or 75a, to the locked cylinder 13 or 13a.

The members 29, 29a for imparting movement to the control valves 36, 36a are pivoted to opposite ends of a link 122 constituting the outer housing of a collapsible member 123. This is normally moved bodily by a manually operated member 129, the end of which is bifurcated to embrace the link 122, and keyed to the tube 51 of the collapsible member.

If one of the control valves seizes, the associated member 29 or 29a ceases to move and holds the associated pivot 124 or 124a stationary. The force applied to the input member 129 will then tend to rotate the link 122 about the stationary pivot 124, or 124a. When the force so applied reaches a given limit, the balls 53 will be forced inward, pressing the plunger 52 back against its spring 54, thus collapsing the member 123. Movement of the member 129 will thereafter cause the link 122 to pivot in relation to it, turning on the stationary pivot 124 to actuate the member 29 or 29a associated with the free control valve.

In the arrangement shown in Figs. 5 and 5a, two hydraulic motors 83, 83a serve to operate a control surface. Parts associated with these motors which correspond to parts shown in Fig. 1 bear the same reference numerals. Also parts associated with the motor 83a which correspond to parts associated with the motor 83 bear the same reference numerals, with the addition of the suffix a.

The pilot's input member 29 is connected to a link 84 which, on movement of the input member, turns about a pivot 85 to shift a linkage 86, 87, 87a, 187, 187a, thereby moving the two control valves 36, 36a in the same direction.

But one of the hydraulic motors, 83, will be described, the other 83a, being of precisely similar construction. The motor 83 comprises a shaft 88, carrying a pair of eccentrics 89, 90 spaced at 180° (i. e. in antiphase) on the shaft. Associated with the eccentric 89 is a set of six cylinders, each containing a piston 91, these cylinders being located radially in relation to the shaft 88. A similar set of six cylinders each containing a piston 92, is associated with the eccentric 90. Associated with each aligned pair of cylinders is one of six distributing valves 93, each of which is held by a spring 94 in contact with a swashplate 95 on the shaft 88. For simplicity but one pair of aligned cylinders, containing pistons 91, 92, and but one associated distributing valve 93, are shown in Fig. 5a. The motor has a drain connection 183 for leading away liquid which may leak past the pistons 91, 92 or the distributing valves 93.

On displacement of the control valve 36, it establishes alternative pressure and exhaust connections to lines 96, 97 leading to each of the distributing valves 93. This results in sympathetic movement of the pistons 91, 92 thereby actuating the eccentrics 89, 90 to rotate the shaft 88 in a direction determined by the direction of movement of the control valve 36. Thus, if line 96 is connected to pressure, and line 97 to exhaust, the piston 92 will be caused to move in and the piston 91 to move out. As the shaft 88 rotates, the swash plate 95 imparts continuous reciprocating movement to all of the valves 93 so that the associated pistons 91, 92 will be alternately connected, at the proper times, to pressure and exhaust.

The shafts 88, 88a of the two motors drive, through gear wheels 98, 98a a common gear wheel 99 connected, by bevel gearing 100, to a threaded sleeve 101, engaging a pair of screw jacks 102 which are moved inwards or outwards, according to the direction of rotation of the member 101, to impart movement to the two portions of the control surface, not shown.

In screw threaded engagement with the boss of the gear wheel 99 is a follow-up rod 103 which operates, by rocking the link 84 about its pivotal attachment 104 to the input member 29, to return the control valves 36, 36a to neutral position.

If either of the control valves, say 36, should seize, the following sequence of events occurs. The associated collapsible member 23 collapses, thereby freeing the catch 77 associated with the corresponding valve 160, which closes under the action of its spring 78. This cuts off pressure from the control valve 36, and also from a line 105. As long as there is pressure in the line 105, a plunger 106 is held, against the action of a spring 107, to maintain contacts 108, 109 closed.

When the pressure is cut off, the spring 107 causes the contacts 108, 109 to be separated, thereby lighting a warning lamp. When the valve 160 closes, its stem 110 moves into position to open a connection between the lines 96, 97, thereby allowing the hydraulic motor 83 to run freely, as it is driven through the gears 99, 98, on continued operation of the still effective motor 83a.

On seizure of the control valve 36a, a precisely similar action takes place. The member 23a collapses and the valve 160a closes, to cut off pressure from the valve 36a, to energize the associated warning lamp, and to connect together the lines 96a, 97a.

Interlocking plungers 111, 111a are provided between extensions 112, 112a of the tubes 51, 51a of the two collapsible members 23, 23a. These operate, as described in U. S. application Serial No. 164,759, when either of the members 23, 23a collapses, to lock the other against collapse.

If the hydraulic motors are geared to a common output shaft by differential gearing, it will be necessary to provide each with a pressure-operated lock, similar to that shown in Fig. 3 for use with the parallel hydraulic jacks, which lock, when the pressure is cut off by closure of the valve associated with the collapsible member, will operate to lock the shaft of the motor whose control valve has seized.

As an alternative to the arrangement shown in Fig. 3, two hydraulic jacks in parallel may be used, which are directly coupled to the output member, with no intervening differential link. In this case it is necessary that a by-pass connection should be established between opposite ends of a failed jack, as in the case of Fig. 2, so that the jack cylinders may move in unison, under the power provided by the still operative jack to operate the output member. The pressure-responsive lock of Fig. 3 is required only in cases of differential coupling of the actuators to the output member, when a failed actuator may otherwise be moved in reverse by the still operative actuators.

What we claim as our invention and desire to secure by Letters Patent is:

1. The combination with a hydraulic actuator having an inlet for liquid under pressure and an exhaust outlet, of a manually operable input member and an output member adapted to be actuated by the actuator, said actuator comprising a control valve movable in opposite directions by said input member to cause liquid to flow through said actuator in alternative paths from said inlet to said outlet and thereby to cause said actuator to move said output member in a direction and to an extent determined by the movement imparted to said input member, a collapsible member linked to the input member and arranged to collapse, in the event of seizure of said control valve and consequent abnormal application of manual force to said input member, and a valve operative on collapse of said collapsible member to cut off the flow of liquid from said pressure inlet to said control valve.

2. The combination with a hydraulic actuator having an inlet for liquid under pressure and an exhaust outlet, of a manually operable input member and an outlet member adapted to be actuated by the actuator, said actuator comprising a control valve movable in opposite directions by said input member to cause liquid to flow through said actuator in alternative paths from said inlet to said outlet and thereby to cause said actuator to move said output member in a direction and to an extent determined by the movement imparted to said input member, a collapsible member linked to the input member and arranged to collapse, in the event of seizure of said control valve and consequent abnormal application of manual force to said input member, a conduit for permitting of free circulation of liquid within said actuator, a valve normally closing said conduit, and means responsive to collapse of said collapsible member for moving said valve to position to open said conduit, said valve when so moved being operative also to cut off the flow of liquid from said pressure inlet to said control valve.

3. The combination with a hydraulic actuator having an inlet for liquid under pressure and an exhaust outlet, of a manually operable input member and an output member adapted to be actuated by the actuator, said actuator comprising a control valve movable in opposite directions by said input member to cause liquid to flow through said actuator in alternative paths from said inlet to said outlet and thereby to cause said actuator to move said output member in a direction and to an extent determined by the movement imparted to said input member, a collapsible member linked to the input member and arranged to collapse, in the event of seizure of said control valve and consequent abnormal application of manual force to said input member, a valve controlling the flow of liquid from said pressure inlet to said control valve, means biasing said valve to a closed position in which it interrupts said flow, and a catch controlled by said collapsible member for normally holding said valve in open position, said catch being freed, on collapse of said collapsible member, to permit said biasing means to close said valve.

4. The combination with a hydraulic actuator having an inlet for liquid under pressure and an exhaust outlet, of a manually operable input member and an output member adapted to be actuated by the actuator, said actuator comprising a control valve movable in opposite directions by said input member to cause liquid to flow through said actuator in alternative paths from said inlet to said outlet and thereby to cause said actuator to move said output member in a direction and to an extent determined by the movement imparted to said input member, a collapsible member linked to the input member and arranged to collapse, in the event of seizure of said control valve and consequent abnormal applications of manual force to said input member, a non-return valve normally held open by the pressure at said inlet to permit passage of liquid from said inlet to said control valve, a plunger coacting with said non-return valve, said plunger being subject to the hydraulic pressure within said actuator, and means controlled by said collapsible member for normally holding said plunger against movement by said hydraulic pressure, said plunger being freed, on collapse of said collapsible member, for movement by said hydraulic pressure to close said non-return valve.

5. The combination with a hydraulic actuator having an inlet for liquid under pressure and an exhaust outlet, of a manually operable input member and an output member adapted to be actuated by the actuator, said actuator comprising a control valve movable in opposite directions by said input member to cause liquid to flow through said actuator in alternative paths from said inlet to said outlet and thereby to cause said actuator to move said output member in a direction and to an extent determined by the movement imparted to said input member, a collapsible member linked to the input member and arranged to collapse, in the event of seizure of said control valve and consequent abnormal application of manual force to said input member, a non-return valve normally held open by the pressure at said inlet to permit passage of liquid from said inlet to said control valve, a conduit for permitting free circulation of liquid within said actuator, a plunger subject to the hydraulic pressure within said actuator and adapted to cooperate with said non-return valve, and means controlled by said collapsible member for normally maintaining said plunger in position to close said conduit, said plunger being freed, on collapse of said collapsible member, for movement by said hydraulic pressure into position to open said conduit and close said non-return valve.

6. In combination, a pair of hydraulic actuators each having a pressure inlet and an exhaust outlet, an input member common to the two actuators, and a common output member adapted to be actuated by the two actuators, each actuator comprising a control valve movable in opposite directions by said input member to cause liquid to flow through said actuator in alternative paths from said inlet to said outlet and thereby to cause said actuator to move said output member in a direction and to an extent determined by the movement imparted to said input member, a collapsible member linked to the input member and arranged to collapse, in the event of seizure of said control valve and consequent abnormal application of manual force to said input member, and a valve operative on collapse of said collapsible member, to cut off the flow of liquid from said pressure inlet to said control valve, said input member being effective, in the event of seizure of the control valve of either actuator, to effect continued operation of the control valve of the other actuator and thereby to cause said other actuator to impart movement to the output member.

7. The combination claimed in claim 6, wherein the actuators are differentially coupled to the output member, and wherein each actuator comprises a normally inoperative pressure-responsive lock adapted, on collapse of the collapsible member of said actuator, to lock said actuator against reverse actuation by the other actuator.

8. The combination claimed in claim 6, wherein said actuators are directly coupled to said output member, and wherein each actuator includes a conduit for permitting free circulation of liquid within the actuator, the valve responsive to collapse of the collapsible member normally closing said conduit but being arranged to open said conduit when moved to cut off the flow of liquid from the pressure inlet to the control valve of said actuator.

9. The combination with a hydraulic jack, comprising a servo member and a housing therefor, of a manually operable input member, an output member coupled to the jack, a pressure inlet, an exhaust outlet, a control valve coupled to the input member and movable in opposite directions from a neutral position to establish alternative connections between opposite ends of said housing and said inlet and outlet and thereby cause relative movement between said housing and servo member to move the output member in a direction and to an extent determined by the movement imparted to the input member, a collapsible member coupled to the input member and arranged to collapse, on seizure of said control valve, under application of manual force to the input member, a conduit for permitting liquid to flow freely between opposite ends of said housing, a normally closed valve in said conduit, a normally open valve for allowing liquid to flow from the inlet to the control valve, and means controlled by said collapsible member for freeing said valves for automatic movement, on collapse of the collapsible member, to their open and closed positions respectively.

10. The combination with a hydraulic jack, comprising a servo member and a housing therefor, of a manually operable input member, an output member coupled to the jack, a pressure inlet, an exhaust outlet, a control valve coupled to the input member and movable in opposite directions from a neutral position to establish alternative connections between opposite ends of said housing and said inlet and outlet and thereby cause relative movement between said housing and servo member to move the output member in a direction and to an extent determined by the movement imparted to the input member, a collapsible member coupled to the input member and arranged to collapse, on seizure of said control valve, under application of manual force to the input member, a normally open valve for allowing liquid to flow from the inlet to the control valve, a normally disengaged pressure responsive lock, and means controlled by the collapsible member for freeing said valve for automatic movement, on collapse of the collapsible member, to cut off the supply of pressure liquid to the control valve and also to cause said lock to lock the housing and servo member against relative movement.

11. The combination with a hydraulic motor, of a manually operable input member, an output member actuable by the motor, a pressure inlet, an exhaust outlet, a control valve movable by said input member in opposite directions from a neutral position to establish a flow of liquid through said motor from said inlet to said outlet in alternative directions according to the direction of movement of said control valve and thereby to cause said motor to move said output member in a direction and to an extent determined by the movement imparted to the input member, a collapsible member coupled to the input member and arranged to collapse, on seizure of said control valve, under application of manual force to the input member, a conduit for permitting liquid to circulate freely through said motor, a normally closed valve in said conduit, a normally open valve for allowing liquid to flow from the inlet to the control valve, and means controlled by said collapsible member for freeing said valves for automatic movement, on collapse of the collapsible member, to their open and closed positions respectively.

ROY WESTBURY.
STANLEY RALPH TYLER.

REFERENCES CITED

The following references are of record in the file of this patent:

UNITED STATES PATENTS

| Number | Name | Date |
|---|---|---|
| 2,315,110 | Dornier | Mar. 30, 1943 |

FOREIGN PATENTS

| Number | Country | Date |
|---|---|---|
| 582,380 | Great Britain | Nov. 13, 1946 |